(No Model.)

A. WEED.
SAW FILE.

No. 538,396. Patented Apr. 30, 1895.

Witnesses
J. G. Hinkel
J. A. Fairgrieve

Inventor
Alfred Weed
by Foster & Freeman
Attorneys

UNITED STATES PATENT OFFICE.

ALFRED WEED, OF ANDERSON, INDIANA, ASSIGNOR TO THE ARCADE FILE WORKS, OF SAME PLACE.

SAW-FILE.

SPECIFICATION forming part of Letters Patent No. 538,396, dated April 30, 1895.

Application filed November 27, 1894. Serial No. 530,177. (No model.)

*To all whom it may concern:*

Be it known that I, ALFRED WEED, a citizen of the United States, residing at Anderson, in the county of Madison and State of Indiana, have invented certain new and useful Improvements in Saw-Files, of which the following is a specification.

My invention relates to certain improvements in files, and consists of a file adapted more especially for gumming, of V-shape in cross section, and with cut faces and edges, as fully set forth hereinafter and as illustrated in the accompanying drawings, in which—

Figure 1:
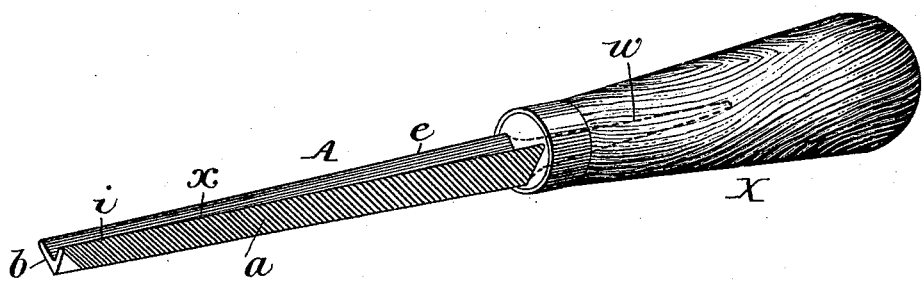
Figure 2:
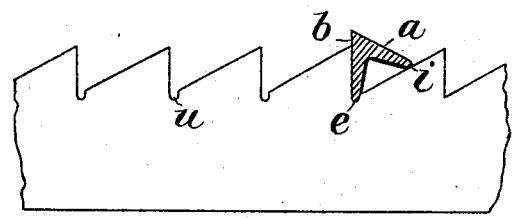
Figure 3:
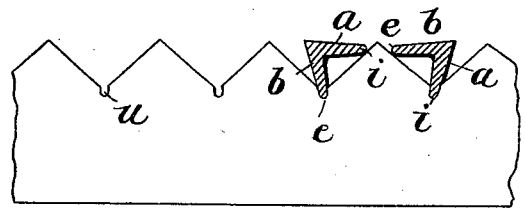

Figure 1 is a perspective view of my improved file; Fig. 2, a view illustrating the application of the file to the gumming of the teeth of a rip saw; Fig. 3, a view illustrating the application to the gumming of the teeth of a cross cut saw.

The body A of the file is of any suitable size and proportion and has two faces $a, b$, at an angle to each other, which is less than a right angle, the sides of the body upon which are these two faces $a, b$, being of suitable thickness to permit the faces to be cut to the required extent, but they form between these sides a channel $x$, so that in cross section the file is practically of a V-shape, and at the end, the body is reduced to form the usual tang $w$ for insertion into the handle X. The faces $a, b$ are cut to any suitable degree of fineness or coarseness according to the character of work required, and the cutting is continued to and along the edges $e, i$, so that the file has two filing faces $a, b$, and two filing edges $e, i$.

The file, thus constructed, is adapted for use in sharpening saws, whether rip saws as shown in Fig. 2, or cross cut saws as shown in Fig. 3.

In cutting the edges of the teeth for sharpening, the faces $a, b$ of the file are applied to the edges, and are used in the ordinary manner.

In order to gum the saw between the teeth, the new file is used according to the character of the teeth to which it is applied. Thus, when, as shown in Fig. 2, the teeth have vertical edges, one of the faces, as for instance the face $b$, of the file, is applied parallel to the vertical edge of one of the teeth, and by properly manipulating the file, the cutting edge $e$ is caused to cut a gumming recess $u$ at the base of the vertical face of the tooth, as shown.

In gumming the teeth of a cross cut saw, as shown in Fig. 3, first one edge $e$ of the file and then the other edge $i$ may be used in forming the gumming recess as indicated by the different positions of the file, as shown in Fig. 3.

It will thus be seen that the file may be used in the ordinary manner, by filing with the faces $a, b$ to sharpen the teeth as usual, and that then by means of the edges $e, i$, the gumming of the saw may be effected. It will be evident also that a file of the description above set forth may be used advantageously for many other purposes.

Without limiting myself to any specific proportions of file, I claim as my invention—

The within described file having two flat cut faces $a, b$, at an angle to each other, and with a groove at the back forming edges $e, i$ to said faces, which edges are cut, substantially as and for the purpose set forth.

In testimony whereof I have signed my name to this specification in the presence of two subscribing witnesses.

ALFRED WEED.

Witnesses:
V. BIGELOW,
GEO. W. HOEY.